(12) United States Patent
Piening et al.

(10) Patent No.: US 6,355,337 B1
(45) Date of Patent: Mar. 12, 2002

(54) STRUCTURAL ELEMENT OF HIGH UNIDIRECTIONAL RIGIDITY

(75) Inventors: Matthias Piening; Arno Pabsch; Christof Sigle, all of Braunschweig (DE)

(73) Assignee: Deutsches Zentrum fur Luft-und Raumfahrt E.V., Bonn (DE)

( * ) Notice: Subject to any disclaimer, the term of this patent is extended or adjusted under 35 U.S.C. 154(b) by 0 days.

(21) Appl. No.: 09/412,656

(22) Filed: Oct. 5, 1999

(30) Foreign Application Priority Data

Oct. 5, 1998 (DE) .......................... 198 45 863

(51) Int. Cl.[7] .................. B64C 3/18; B64C 11/20
(52) U.S. Cl. .................. 428/223; 428/292.1; 428/293.7
(58) Field of Search .................. 498/292.1; 428/223, 428/293.7

(56) References Cited

U.S. PATENT DOCUMENTS

| | | |
|---|---|---|
| 4,565,595 A | 1/1986 | Whitener |
| 5,496,002 A | 3/1996 | Schutze |
| 5,735,486 A | 4/1998 | Piening et al. |
| 5,922,446 A | 7/1999 | Piening et al. |
| 5,924,649 A | 7/1999 | Piening et al. |

FOREIGN PATENT DOCUMENTS

| | | |
|---|---|---|
| DE | 37 39 753 A1 | 8/1989 |
| EP | 0 758 607 A2 | 9/1996 |
| GB | 2193698 | 2/1988 |
| GB | 2304090 | 3/1997 |
| GB | 2331282 | 5/1999 |
| WO | 83/01238 | 4/1983 |

*Primary Examiner*—Rich Weisbergen
(74) *Attorney, Agent, or Firm*—Salter & Michaelson

(57) ABSTRACT

In a structural element of high unidirectional rigidity, in which unidirectional fiber strands are completely embedded in sheaths and said sheaths are connected to a shell skin and wherein part of the shell skin is in the form of stringers, there is provided an inner division of the cross-section of the shell skin thereby providing the strength of the fibers and the stiffness of the fibers in a direction perpendicular to the skin plane for every direction of loading.

22 Claims, 10 Drawing Sheets

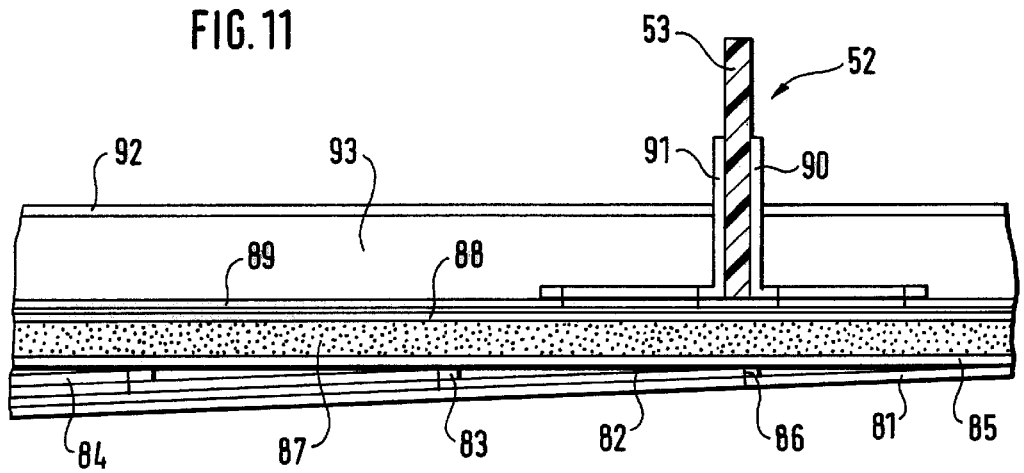
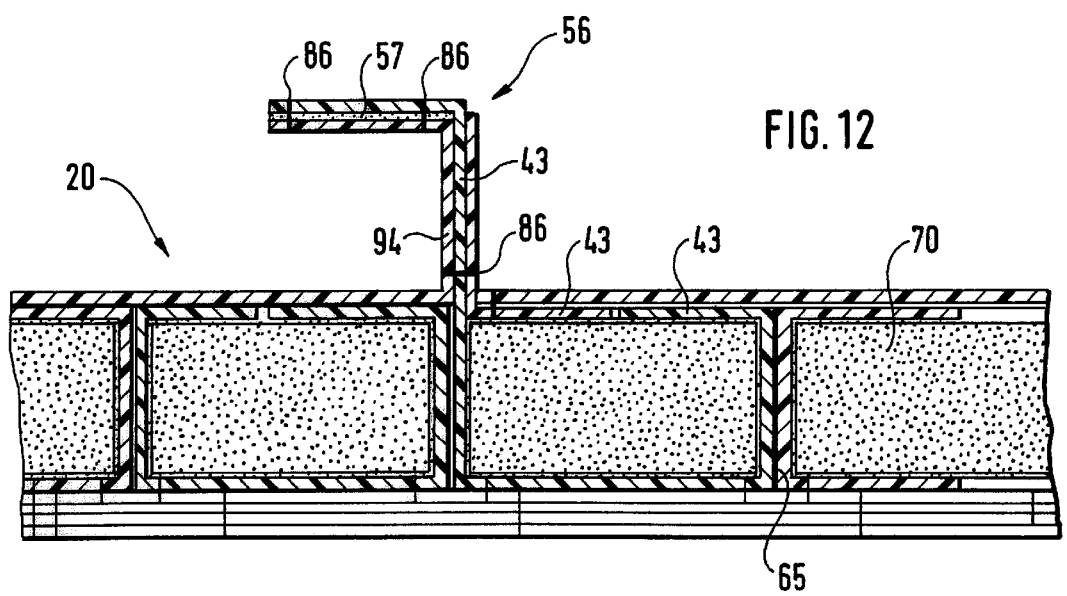

STRUCTURAL ELEMENT OF HIGH UNIDIRECTIONAL RIGIDITY

DESCRIPTION

1. Technical Field

The invention relates to a structural element of high unidirectional rigidity, in which unidirectional fibre strands are completely embedded in sheaths and said sheaths are connected to a shell skin and wherein part of the shell skin is in the form of stringers whereby the shell skin has a skin plane and comprises a skin thickness. It also relates to a method of producing dimensioned amounts of fibre stiffness perpendicular to the skin plane of the shell skin in the case of large structural elements.

2. Background of Related Art and Summary of the Invention

Structural elements of high unidirectional rigidity are known. For example, EP 0 758 607 A2 and U.S. Pat. No. 5,735,486 disclose a wing having shear resistant wing shells made of fibre reinforced materials for use in aircraft. In the case of the wing, tensile and compressive force accommodating elements are disposed on the inner face of the wing shells. These are in the form of unidirectional fibers extending longitudinally of the wing. Mutually spaced stringers, whose fibre constituent is formed from a layered fibre structure which is connected to the layered fibre structure of the wing shell, are formed on the inner face of the wing shell longitudinally of the wing. Unidirectional fibre bundles, which are embedded in the shear resistant wing shells, are arranged between the mutually spaced stringers. They extend longitudinally of the wing and are substantially rectangular in section. The space between the stringers accommodates a plurality of fibre bundles and it is divided across its width by partition walls extending parallel to the stringers. The fibre portion of the stringers and/or of the partition walls is formed by folding at least the inner fibre layer of the torsion skin of the wing shell. The partition walls may be provided with layered sections which lie on the upper face of the fibre bundles.

The expression fibre structures is usually understood as meaning laminar structures which are formed by layering differently oriented unidirectional individual layers. A method of manufacturing conventional laminar structures is known from DE 37 39 753 A1. However, all of these structures have the disadvantages of the state of the art i.e. stresses perpendicular to the fibers, a danger that the laminations will part due to a lack of stiffness over the matrix layers, and restricted ability to dimension them due to the multi-axial stresses. In addition, it is not possible to provide a so-called fail-safe form of construction.

When using isotropic materials, an adequate degree of stiffness is needed in every direction subjected to loads. Consequently, it is known to use multi-layer laminates in order to obtain adequate degrees of stiffness in each direction. Since each of the direction related properties alters in dependence on the layer in accord with the orientation of the fibers, the tensile stresses in a cross-section of the wall are very inhomogeneous and the failure behavior is correspondingly complex. Thus, stress components may be at work which are effective in the direction of least rigidity. The rigidity of a purely longitudinally loaded unidirectional single layer is, for example, 50 to 250 times greater than in the case of transverse tensile loads. Fibre reinforcements having a unidirectional fibre orientation are, however, very much less sensitive to transverse compressive strains than to transverse tensile stresses, for which reason the rigidity is some three times greater in the case of transverse compressive loads. The transverse tensile stresses in particular can represent an unfavorable load on the boundary layer between the fibre bundles. Stresses are thereby conveyed in a direction perpendicular to the direction of orientation of the fibers. The resin layer between the fibre strands must be able to withstand these stresses. However, a corresponding problem is also presented by the stress in the boundary layer between the fibers and the resin of a transversely loaded unidirectional single layer.

Consequently, the object of the invention is to produce a structural element of the type mentioned in the first part of claim 1 which overcomes the aforementioned problems and in which considerably higher failure limits can be achieved by constructional measures than are attainable when using currently available laminar structures.

In the case of a structural element of the type mentioned in the first part of claim 1, this object is achieved in that there is provided an inner division of the cross-section of the shell skin thereby providing the strength of the fibers and the stiffness of the fibers in a direction perpendicular to the skin plane for every direction of loading, and in that one or more parting layers and/or a joint are provided in or on an upstanding skin fold and/or within the shear resistant sheath of a fibre strand.

The invention is based on the realization that the requisite rigidity cannot be matched to the flow of forces in the structure by providing a large area textile structure consisting of differently oriented individual layers. Rather more, a partially isotropic structure would thereby be produced which, additionally, has a low degree of stiffness perpendicular to the plane of the shell skin and is inclined to become delaminated.

The special feature of the solution in accordance with the invention lies in the deliberate usage of the decoupling caused by the envisaged parting layer for the anisotropic structural design. This decoupling results in directed frictional connections in each of the spatially separated regions which can be optimally withstood by parallel disposed fibers, i.e. which can be overcome. The stress, the stiffness and the strength are all oriented in the same direction.

The crucial point of the advantage of this solution lies in the freedom obtained in this manner of being able to design an entire structure in such a manner that the course of the frictional connections is optimal in the sense of the behavior of the structure. Unfavorable loading of the fibers is avoided to the widest possible extent. In addition, premature failure is practically eliminated.

Good utilization of the high rigidity of the fibers is made possible by virtue of the principle underlying the invention. The failure behavior of the structure is determined by the fibre stiffness and no longer, as was frequently the case in the state of the art, by the secondary stiffness transverse to the orientation of the fibers. As a result of the invention, an anisotropic design is now possible for the entire structure instead of the isotropic designs using anisotropic materials that are conventional today.

It has already been proposed in DE 197 30 381 C1 and GB 2 331 282 A, to additionally equip structural elements of high unidirectional rigidity with parting layers which interrupt the stress flow between adjacent unidirectional fibre bundles. This step is very advantageous, but as a sole measure, the result thereof is that all of the force flows between the unidirectional strand elements are interrupted except in the case of a compressive loading when the boundary faces are contacted. Due to the invention however, there is, in addition, a complete decoupling action, even under compressive loads, in the sense of an optimal loading of the fibre strands.

By using the measures in accordance with the invention, the advantage is obtained that one can avoid the failure of a component, as occurs when using unidirectional individual layers in a multi-layer composite, wherein stress components transverse to the orientation of the fibre occur under load, and shear stresses are generated which can cause the undesired failure of the component at values far below the theoretical values or those measured in the fibre strands. Through the formation of a structure in accordance with the invention, a structural element is obtained in which appreciably higher failure limits are produced since the critical stress components are, to a large extent, avoided through the construction of the structural element. In the structural elements designed in accordance with the invention, the inner force flows are forced towards the load bearing fibers or fibre strands. The rigidity of the fibers can be fully utilized due to the concurrence of the force flow direction and the orientation of the fibers since the fibers are merely subjected to a purely longitudinal loading force. The structural element is advantageously loaded in accord with the fibre properties.

Consequently, it is particularly advantageous if the fibre strands are substantially fully decoupled from transverse and shear loads. However, in order to obtain a simpler solution insofar as the construction thereof is concerned, superimposition of the less critical transverse compressive strains can be accepted. It is then advantageous if the compressively loaded fibre strands are supported against buckling, As a result of the decoupling, force flows cannot be conveyed via the sheaths surrounding the fibre strands. The sheaths thereby enclose the fibre strands like cells. As a result, the enclosed fibre strand behaves like a very longitudinally stiff yet pliable rod which cannot accommodate transverse load components without external support nor compressive forces without sufficient support against buckling. In accordance with the invention, this support is provided by the shear resistant skin layer. The skin stringers are connected to the shell skin in the vicinity of the feet of the stringers and likewise support the fibre strands. In addition, the shell skin and the stringers are mutually supportive whereby the stringers cater for the support of the shell skin in regard to buckling. Basically, unidirectional states of stress subsist in the stringers. Consequently, unidirectional stiffeners are preferably disposed in the stringer shells.

In order to provide an optimal weight for the construction and an optimal deformation behavior while retaining a high level of rigidity, the fibre stiffeners are globally aligned in accord with the direction of the cross-sectional parameters caused by the external load. The fibre strands are thereby oriented in the direction of the global frictional connections. If, for example, a slim structural element equipped in this manner is subjected to bending forces, there is a resultant, substantially mutually parallel alignment of the fibre strands over the width thereof. The state of stress in the fibre strands then remains uniaxial even when subjected to other loadings, for example, a transverse flection or shear deformation. Advantageously thereby, the fibre strands can be continuously dimensioned by making use of their fibre stiffness. Limits to their elongation need not be observed. The shell skin is merely designed in accord with the task appertaining to the specific application as regards the support of the fibre strands and the desired deformation behavior of the component. In regard to the partial cross-section thereof, the thickness of the skin can be continuously and independently varied.

The orientations and/or preferred directions of the material properties in the unidirectionally aligned fibre strands conform to the actual state of stress. The use of a carbon fibre reinforced synthetic material is particularly preferred. Due to the advantageous orientation of the fibers in the direction of the unidirectional stresses, the stiffness of the fibers and the strength thereof can be utilized to the full. Since the fibre strands and the shear resistant shell skin can, advantageously, be dimensioned independently of one another, it is possible to adapt them to the current requirements in a specific manner.

Fibre strands consisting of carbon fibers have proved to be advantageous due to their very high stiffs or very high strength in dependence on the actual type of fibre being used. Their specific characteristics are up to seven or eight times higher than those of an aluminum alloy for example, whereby the values in the case of a unidirectional loading are some 3.5–4 times higher than for a quasi-isotropic design. In the case of the latter, the stiffs are oriented equally in each direction, usually 0°, 90° and ±45°. However, the directionally related performance of an anisotropic material is thereby lost whereas it is employed to advantage for the fibre strands in accordance with the invention. The fibers in the composite are loaded in each direction and thus subjected to transverse elongations i.e. stress components transverse to the fibers which lead to a premature failure of the structural element. Moreover, in comparison to metals, fibre materials have a substantially better fatigue behavior as long as they are only loaded in a direction along the fibers.

Preferably, there is provided a longitudinal supporting layer for accommodating longitudinal elongations and a shear supporting layer for accommodating shear deformations of up to predeterminable magnitudes. The orientations of the fibers in the laminate of the shell skin thereby amount preferably to ±45° and/or 0°, whereby these angles may be modified somewhat from a constructional point of view. For the purposes of attaining a deformation coupling, the fibre strands must be oriented at an angle of ±β≠0 (preferably 0° to 25°) relative to the direction of the load. In order to support the coupling behavior, one or both orientations of the ±45° layer may adopt an angle differing therefrom by up to about 10°. It is particularly preferred that the two layers be connected together and that a boundary layer be provided between the two layers for accommodating the forces arising from their combined deformation. It is advantageous therefore that 90° layers should not be provided in the shell skin since these layers cannot arrest tears in the matrix and cause additional interlaminar loads. Through the use of fibre materials, immense differences in stiffness partially occur, for which reason there is a greater elastic extensibility when the 90° layers are dispensed with.

It is preferred that the fibre strengtheners and/or stiffeners of the structural element be provided in the folds of the shell skin or the stringers. However, they may also be arranged in the region of the fibre bundles in the sheath. A further possibility consists in arranging them in the region of the sheer resistant laminate of the shell skin. Here, it is particularly preferred that they be provided in the form of a sewn reinforcement.

It is particularly preferred that the stringers of the shell skin be included with the alignment of the fibre orientation. The structural elements can thereby be made to have a very light construction which then has a high tolerance to damage and provides a directed concept for the deformation behavior under load. The stringers form the buckling support means for the thin walled shell skin.

Preferably, one or more parting layers may be introduced. These may be provided either in an upstanding fold of the skin or a stringer, or within the shear resistant sheath of a fibre strand. This has proved to be particularly advantageous for preventing the formation of tears. The provision of a parting layer between the shear resistant sheaths of the unidirectional fibre strands leads to an interruption in the force flows between the unidirectional fibre strands, whereby the transverse tensile elongations and shear elongations at the bordering faces of the fibre cross-sections will be interrupted. In the case of longitudinal tensile loads, the cross-section of the fibre strands are drawn together due to the transverse contraction, whereby the individual strands gape apart and all of the normal and shear frictional connections are neutralized. In the case of longitudinal compressive loads, the cross-sections of the strands expand correspondingly, whereby the strands are pressed together. Transverse compressive stresses, but not shear stresses, thereby ensue in the cross-sections since the inserted parting layer allows the bordering surfaces to slide upon one another in a manner similar to a pile of boards sliding upon one another.

A particular advantage of the invention thus lies in that the number of structural variables can be reduced to a comprehendible level. The individual structural elements can be continuously dimensioned and their stiffness and strength can be aligned in precise accord with the global force flows specific to the application. Large jumps in stiffness no longer occur, for which reason the interlaminar stresses can be reduced to their least possible value. In the case of unidirectional fibre strands, the individual fibers or a roving can thereby be matched as the smallest unit specifically to the application. In the shell skin, which, in particular, is a torsion shell, this is preferably the ±45° pair of laminates which usually has a layer thickness of 0.25 mm.

A further advantage lies in that the directed force flows can be influenced, for the purposes of achieving an optimal accommodation of the load, such that the desired deformation behavior of the whole structural element is achieved at the same time. It is thereby possible to produce a structural element which, on the one hand, is very flexible and, on the other hand, is highly rigid. The accommodation of large longitudinal and shear forces occurs separately in two interconnected layers. Each layer thereby bears the load components allotted thereto, and a border layer between the two layers preferably bears the forces caused by the combined deformation of the two layers. It is preferred thereby that the longitudinal elongation be accommodated by the longitudinal supporting layer and the shear deformation by the shear supporting layer.

It has proved to be particularly advantageous that, for sections in the loaded skin fields of a structural element, the longitudinal force flows can be diverted around these regions of the section by utilization of the construction of the structural element in accordance with the invention, since, due to the measures in accordance with the invention, the result is achieved that the state of stress within the fibre strands is substantially unidirectional. Concentrations of stress, which can occur in the region of the sections in shell skins or structural elements subjected to a load, can be balanced out by dimensioning the cross-section of the fibre strand. It is due to this feature precisely that the longitudinal force flows can be diverted around the weakened regions of the structural element.

For the purposes of producing dimensioned amounts of fibre stiffness perpendicular to the skin plane of the shell skin in the case of large structural elements, an RTM process functioning at differential pressures (Differential Pressure Resin Transfer Moulding) is used. An autoclave thereby provides the counter pressure required for the manufacturing process. A dry, semi-finished layered product is positioned in a molding cavity of the autoclave by means of a one-sided stitching technique, fixed and moistened with resin at a controlled flow speed.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which:

FIG. 11 is a sectional view of another embodiment of a structural element equipped in accordance with the invention;

FIG. 12 is a sectional view of another embodiment of a structural element equipped in accordance with the invention;

DETAILED DESCRIPTION OF THE ILLUSTRATIVE EMBODIMENTS

Figure 1:
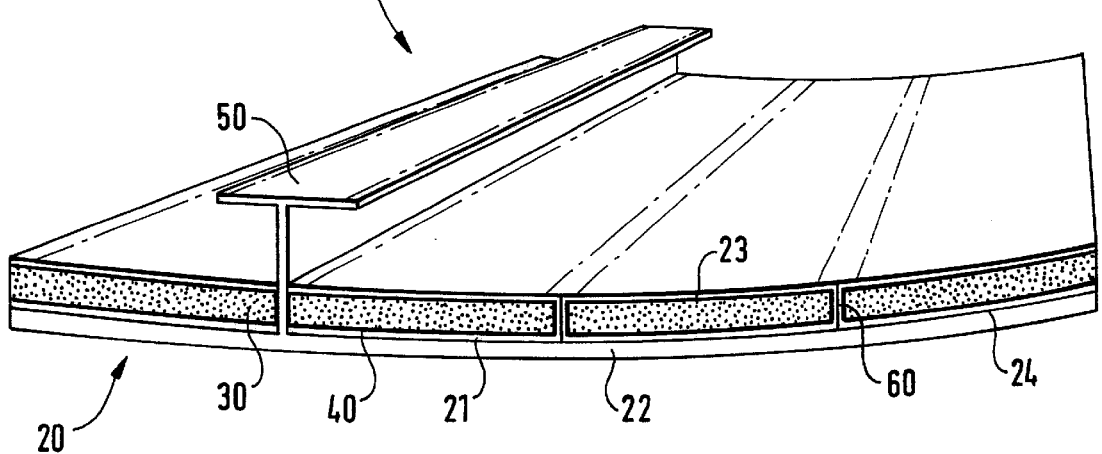
FIG. 1 is a perspective view of a structural element designed in accordance with the invention.

A perspective view of a structural element 10 designed in accordance with the invention is illustrated in FIG. 1. The structural element 10 comprises a shell skin 20 in the form of a torsion shell. This is a torsion shell due to the shear laminates or torsion layers within the shell skin. Unidirectional fibre strands 30 are embedded therein. The unidirectional fibre strands themselves are encased by a sheath 40.

The shell skin 20 comprises an inner layer 21 and an outer layer 22 on its outer surface. The shell skin 20 comprises an inner layer 23 on its inner surface. A stringer 50 is folded upwardly from the inner layer 21. The stringer is T-shaped and extends along the inside of the shell skin substantially perpendicularly thereto. It serves to bind the fibre strands.

Figure 2:
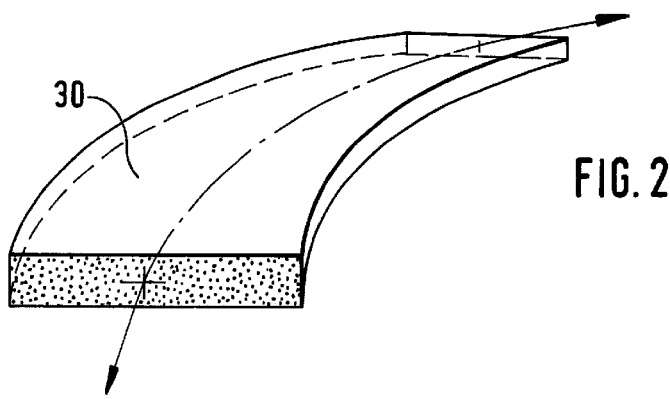
FIG. 2 is a perspective view of a fibre strand from the structural element of FIG. 1.

The fibre strands 30 are arranged in the sheaths 40 between the two inner layers 21 and 23 in the shell skin 20. The encased unidirectional fibre strands are in the form of so-called endless fibre strands. They have a varying or variable orientation and a varying cross-section. This can be better appreciated from FIG. 2 and is indicated therein by means of the two arrows. Thus, the cross-section may vary over the length of the fibre strands should this be required by the application of use. Hereby, the fibre strands may, for example, be narrower as indicated by the dashed lines in FIG. 1.

Figure 7:
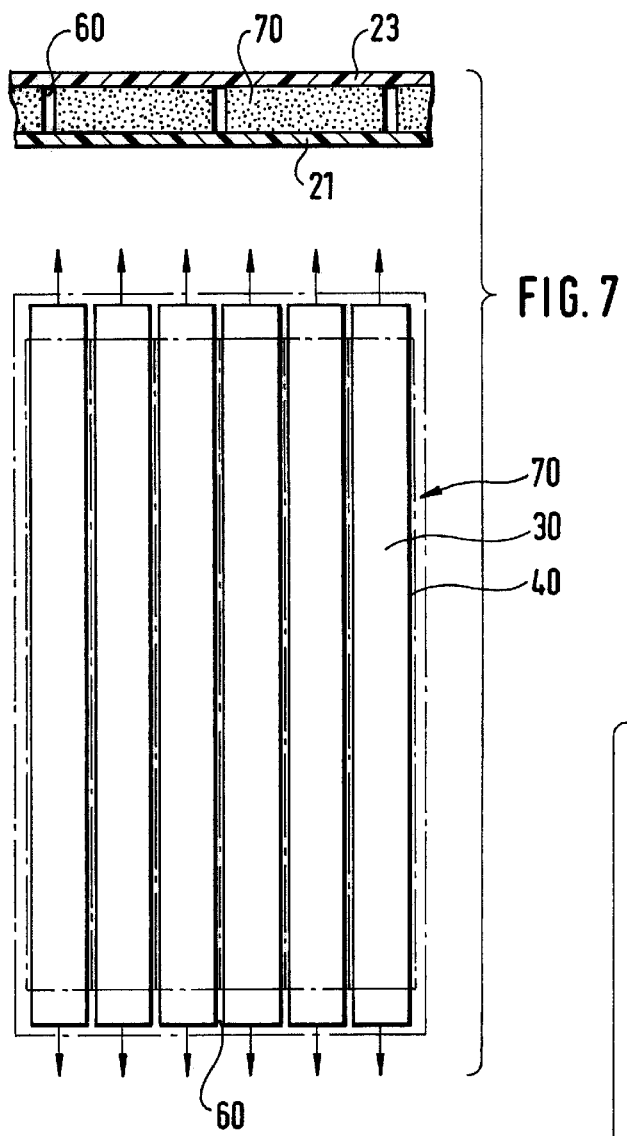
FIG. 7 is a conceptual sketch of unidirectional fibre strands subjected to a tensile load.
Figure 8:
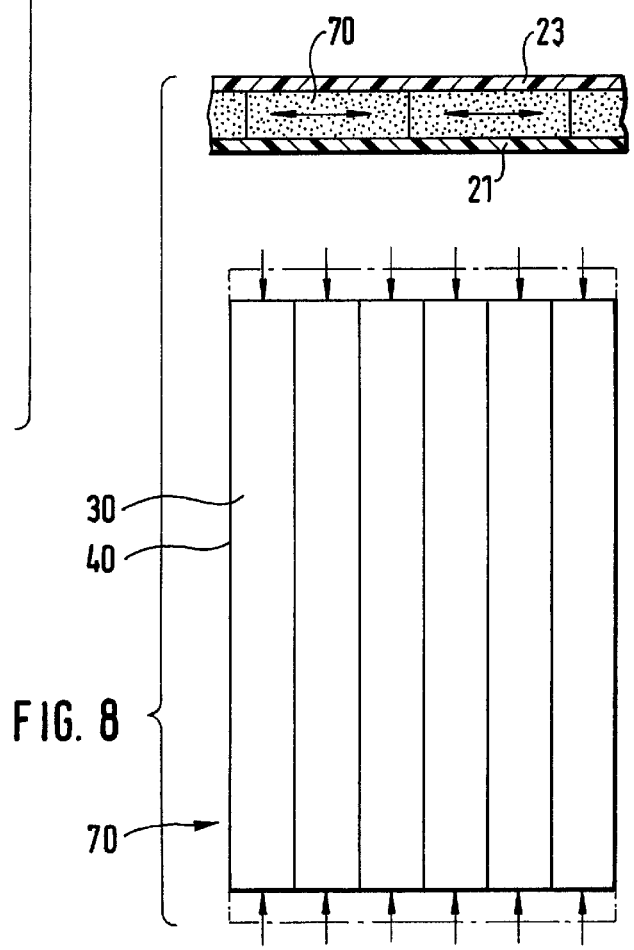
FIG. 8 is a conceptual sketch of compressively loaded unidirectional fibre strands.

Furthermore, joints 60 are formed in the skin cross-section of the structural element between the individual segments 70 formed from the fibre strands 30 encased by the sheaths 40. These joints serve to decouple the individual segments from each other. As a result thereof, neither transverse tensile stresses nor shear stresses will be conveyed within the plane in which the segments 70 are arranged. Transverse compressive strains can however be conveyed insofar as the segments touch one another under longitudinal compressive loads, as is shown in FIG. 8. In the case of compressive loads, longitudinal stresses and transverse compressive strains are effective on the unidirectional fibre strands. Under the effects of purely tensile loads on the unidirectional fibre strands (FIG. 7), the latter gape apart and only longitudinal stresses then occur. However, due to the provision of the sheaths 40, lateral support for preventing the fibre strands from buckling is provided, and, due to the provision of the torsion shell with the differently dimensioned stiffs and strengths of the fibers, shear forces applied to the structural element are removed. The edges of the fibre strands, which extend in the same direction as the joints 60, thereby remain substantially stress-free.

Figure 3:
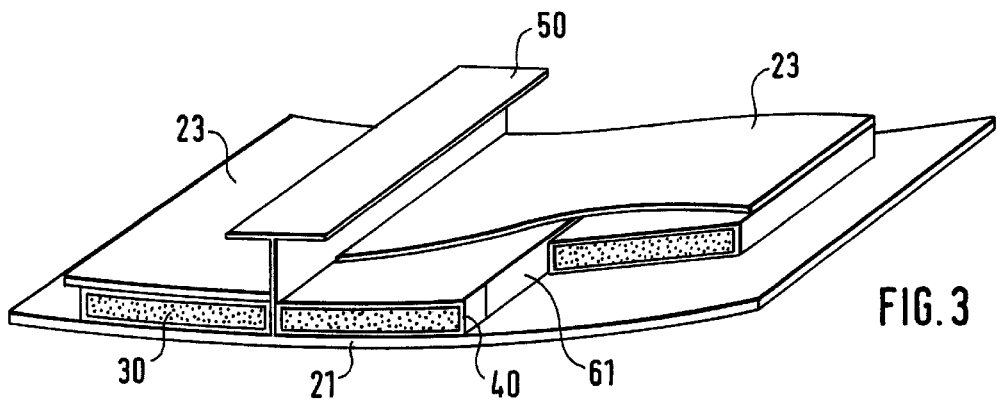
FIG. 3 is a perspective view of a partially exploded structural element.

A perspective view of a second embodiment of a structural element 10 designed in accordance with the invention is shown in FIG. 3. This comprises parting layers 61 between the individual sheaths 40 of the fibre strands 30 instead of the joints 60 depicted in FIG. 1. Furthermore, the sheaths are covered on their inner and outer surfaces by laminates which form the inner layers 21 and 23 and also accommodate shear forces. Consequently, the layers 21 and 23 could also be referred to as torsion layers. In addition, a boundary layer 24, which accommodates the forces caused by the collective deformation of the two layers 21, 22, is provided between the inner layer 21 and the outer layer 22.

The stringer 50, which is substantially perpendicular to the plane of the shell skin, is formed by folding upwardly the torsion layer 21 arranged on the outer surface of the shell skin 20. Since the stringer is an integral part of the torsion layer, one need not worry that the stringer will become detached therefrom. The stiffness of the composite comprised by the shell skin and the stringer is selected in dependence on the design of the fold.

The torsion layers may be designed independently of one another. The stiffness of the fibers is thereby made use of in optimum manner. Three dimensional fibre reinforcements may also be provided here. Nevertheless, the number of parameters for the projected design of a structural element designed in accordance with the invention is smaller than that required for the known wing units built up from multi-layer composites.

The particular advantage arising from this construction is that there is a functional separation over two separate areas, namely, one region for accommodating longitudinal loads and creating a coupling for the structure, and one region for removing shear forces and achieving an optimal surface quality.

Figure 10:
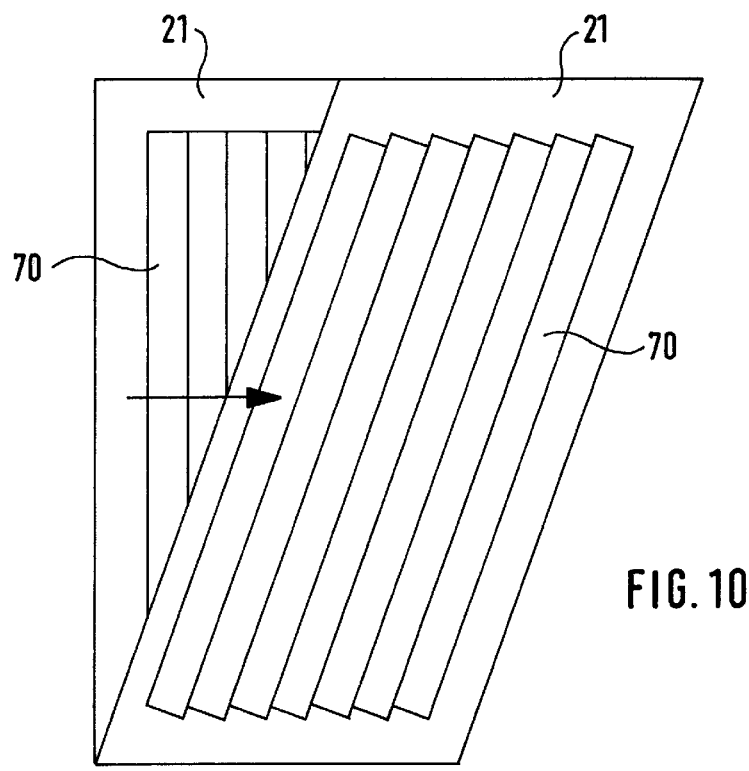
FIG. 10 is a basic sketch of a torsion layer having unidirectional fibre strands in the undeformned and deformed states.

Each segment 70 is a unidirectional strand having a casing. As a result of the decoupling of the transverse tensile stresses and shear stresses within the plane incorporating the segments 70 in accordance with the invention, the individual fibre strands integrated into the structure of the shell skin 20 and connected to the layers 21 and 23 slide over one another like a loosely packed pile of boards. A basic sketch thereof is provided in FIG. 10. The left-hand side of this illustration depicts an arrangement of mutually parallel segments 70 within a torsion layer. By contrast, the right-hand side of the illustration depicts a deformed torsion layer containing the still mutually parallel segments 70. It is particularly clear from this that the individual segments within the torsion layers are relatively displaced and slide upon one another. The torsion layers on the other hand are subjected to a shear deformation.

However, the decoupling of the individual segments causes the longitudinal stiffness of the unidirectional fibre strands or the layer incorporating the unidirectional fibre strands to decrease. Nevertheless, due to the effect of the coupling of the individual segments via the layers of the shell skin, a backward rotation having a torsion angle of zero can be achieved, in the case of comparatively small angles of orientation of the fibre strands, for a box girder subjected to a combination of bending and torsional loads. In the case of smaller angles of the fibers, the modulus of elasticity of this fibre layer of the shell skin is higher and this results in a lesser deflection of the structural element. This may be explained by the fact that a structure not subject to limitations on its elongation (such as that in accordance with the invention in which the limitations on elongation otherwise construed in the state of the art due to the multi-layer laminate construction are avoided) is more supple than a structure having such limitations. Moreover, the weight of the whole structural element is reduced in the case of smaller fibre angles of greater stiffness. This may for example, amount to 18% and more vis a vis a laminar structure having a multi-layer laminate construction.

Figure 4:
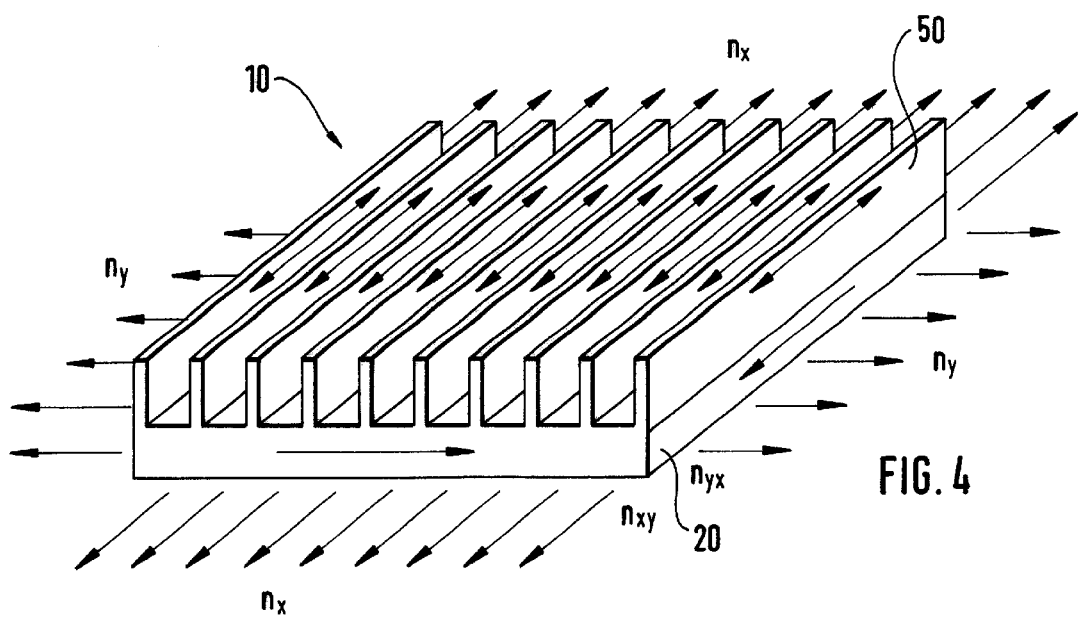
FIG. 4 is a perspective view of a structural element indicating the force flows.

FIG. 4 shows a perspective view in the form of a basic sketch of a structural element 10 with the force flows being indicated thereon. These are indicated in the form of arrows. The differing resultant regions having differing orientations of force flows are provided with the references $n_x$, $n_y$, $n_{xy}$, $n_{yx}$. The force flows thereby extend in the shell skin 20 with every indicated orientation. By contrast however, the force flow in the stringers 50 is merely conducted in the longitudinal direction of the stringers i.e. in the $\pm n_x$ direction. Thus, the stringers too are decoupled. Basically, only unidirectional states of stress are present therein. Consequently, unidirectional stiffeners are preferably arranged in shells 51 of the stringers (FIG. 9), i.e. in the spaces formed in the vicinity of the foot of a stringer.

Figure 5:
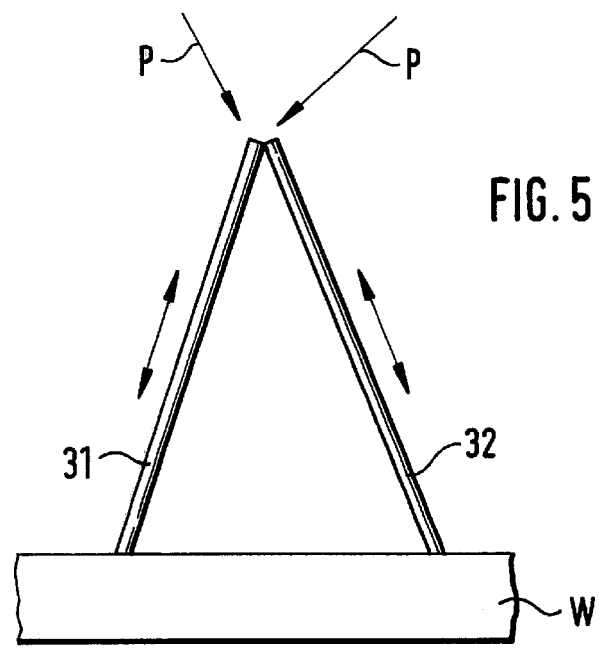
FIG. 5 is a sketch of two rods loaded by forces P for clarifying the force flows in non-rigid framed structures.

The principle of uniaxial states of stress, as in the fibre strands or the stringers, is clear from FIG. 5 which shows an illustration of two co-operating rods 31, 32 located in a plane and forming a triangle supported on a wall W. They provide a simplified illustration of a non-rigid framed structure representative of a large area wing unit as the structural element 10. Two forces or loads P illustrated by the arrows are effective on the rods. The direction of force flow in the rods is thereby always the same as the orientation of the rods. The magnitude of the force flow is dependent on the orientation of the rods relative to the direction of the load.

Figure 6:
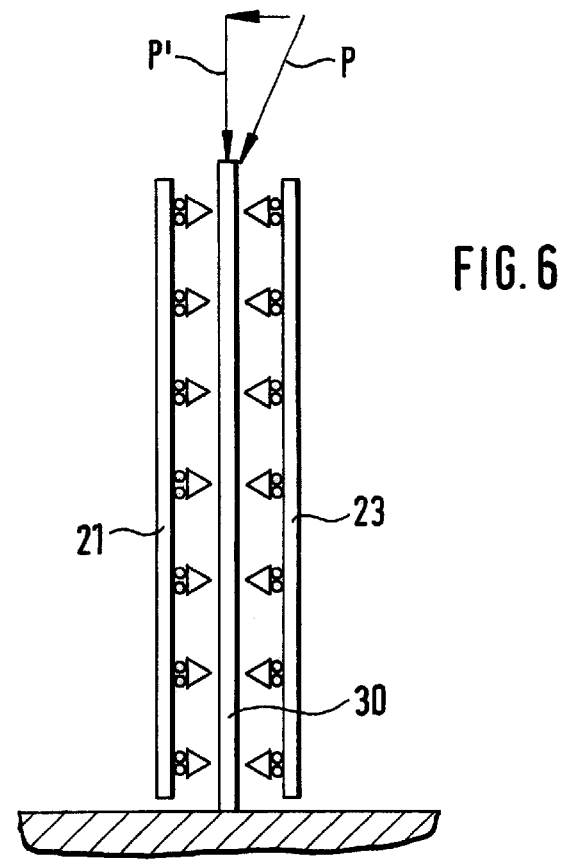
FIG. 6 is a conceptual sketch of a fibre strand having a torsion layer.

In addition, FIG. 6 provides a perspective sketch of a fibre strand 30 which is fixed at one end and is supported in sliding manner, in the longitudinal direction, on each side by torsion layers 21 and 23. When a force P is effective on the strand, there is merely a longitudinal force P' extending longitudinally of the strand, shear deformations being accommodated by the two torsion layers.

Figure 9:
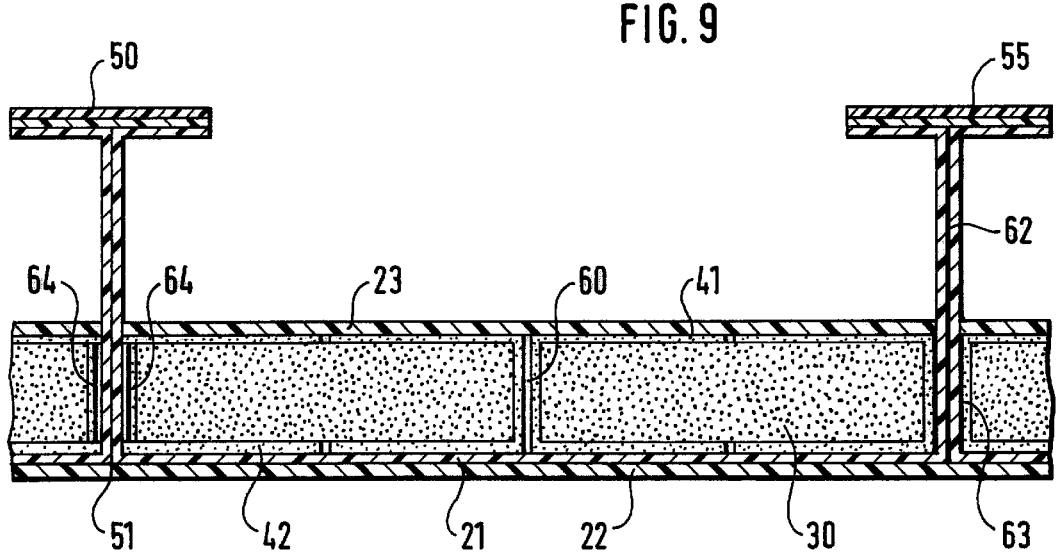
FIG. 9 is a sectional view through a structural element having two stringers and parting layers.

FIG. 9 depicts various ways of arranging the parting layers so as to permit two adjacent sheaths in the shell skin 20 to slide upon one another. The parting layer 62 is arranged in the projecting skin fold or stringer 55, whereas the parting layer 63 is arranged on the stringer 55 between the sheath 41 and the stringer. As an alternative thereto, the parting layer 64 is provided within the shear resistant sheath 42.

The shear resistant sheaths 41, 42 are surrounded by the torsion layers 21 and 23 at an orientation of ±45°, whereby the layer 21 comprises, on its outer surface, an outer layer 22 having stratified layers whose orientations are preferably 45°. All of the shear and transverse loads are thereby accommodated by these layers so that only the longitudinal forces are effective in the fibre strands 30 as can be seen from FIG. 6 and FIG. 7.

FIG. 11 and FIG. 12 show two further embodiments of structural elements designed in accordance with the invention in the form of sectional views. The structural element of FIG. 11 has a wedge-shaped cross-section. This is produced by laying the outer relatively stepped layers 81 to 84 upon one another and sewing them together at positions 86 of the shell skin 20. These stepped layers are covered by a covering layer 85 for the purposes of straightening the upper surface. A unidirectional layer 87 having a stiffness appropriate to the actual application of use is added on top of the layer 85.

On the surface thereof remote from the layer 85, the layer 87 comprises a layer 88 which, for example, has the same orientation as the layer 85. A further layer 89 that is connected to a stringer 52 is arranged on the layer 88. The layer 89 comprises a rib 53 which is provided with layers 90, 91 on its outer surfaces. The two layers 90, 91 are sewn to the layer 89 at the foot of the rib. A further stringer, which extends perpendicularly relative to the first stringer 52 and whose flanges 90, 91 serve for the attachment of a rib 53, is connected to the layer 89.

The region around the foot of the rib is covered with resin up to a height corresponding to half that of the angled layers 90, 91 which extend substantially at right angles from the plane of the layer 89, a cover layer 92 being disposed on the resin layer 93.

A structural element made up of a plurality of segments 70 and having a stringer incorporating a web 56 is shown in FIG. 12. The web is provided with a unidirectional flange reinforcement 57. The other layers of the stringer incorporating the web 56 and the flange reinforcement 57 are formed from individual layers of the shell skin 20. They are comprised by two parts from a sheath 43 and one part from an inner layer 94. Sewing positions 86 at which the individual layers are connected together are also provided here. The sewing positions are arranged at the corners and in the vicinity of the foot of the web 56.

The regions of the segments 79 incorporating the unidirectional fibre strands within the sheaths are separated from one another by means of parting layers 65. Such a layer may also be provided on the web 56 of the stringer.

Figure 13:
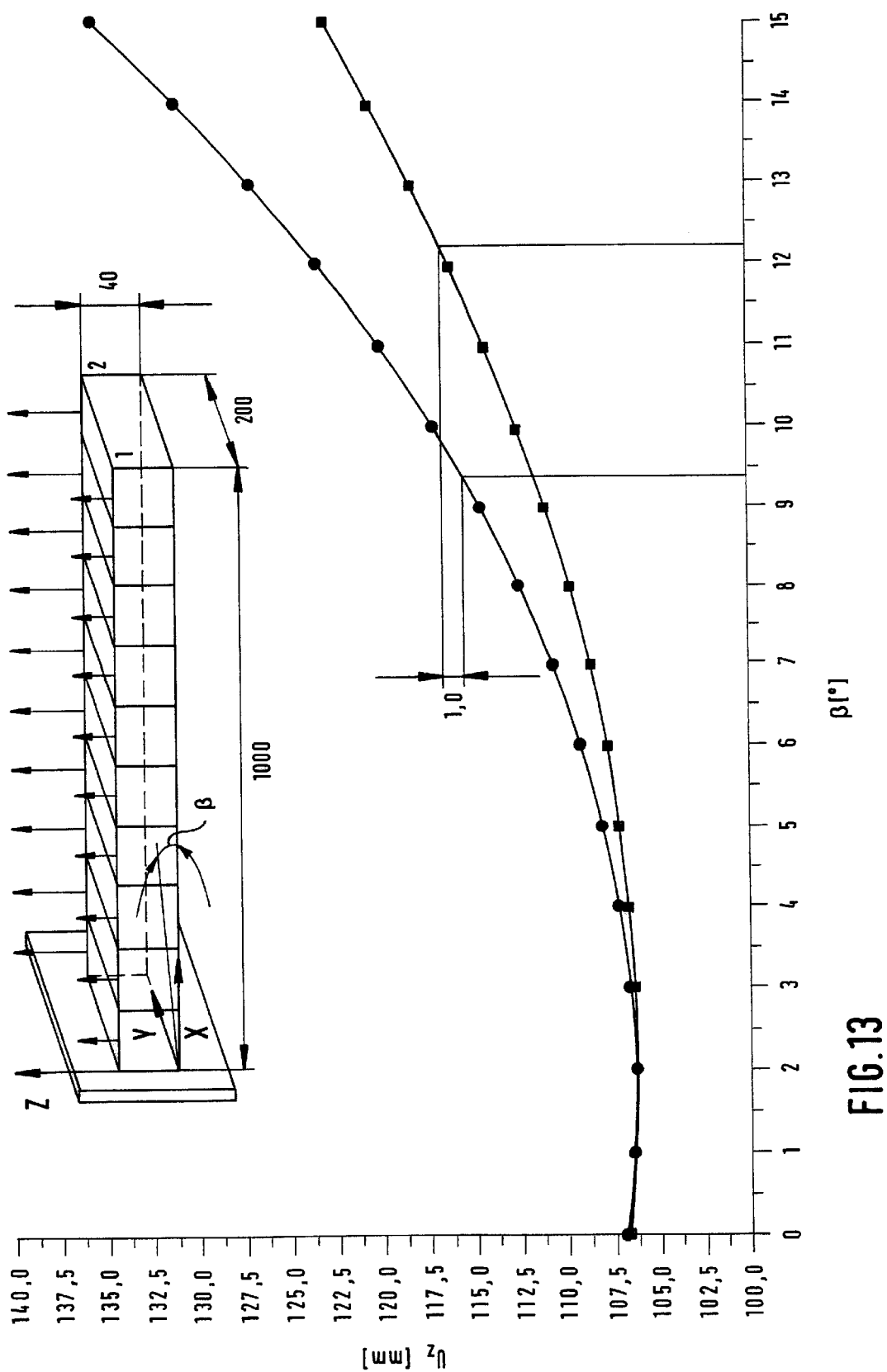
FIG. 13 is a view of a diagram for illustrating the vertical displacements of a conventionally designed flection beam and of a flection beam designed in accordance with the invention which is subjected to deflecting and torsional loads.

FIG. 13 provides a view of a diagram for illustrating the vertical displacements of a conventionally designed flection beam based on a laminate structure and of a flection beam in the form of a structural element designed in accordance with the invention. For equal laminate thicknesses or masses, the displacement is measured at the end of the beam in dependence on the angle B of the fibre. The upper curve shows the behavior of the structural element designed in accordance with the invention. The lower curve shows the behavior of a conventionally designed flection beam. The deflection at the end of the beam arises from a complete backward rotation of the beam. The decoupling of the individual layers of the shell skin of the structural element in accordance with the invention causes a reduction in the longitudinal stiffness of the unidirectional layer when the angle of the fibre remains unchanged. However, as a result of the greater coupling effect, a backward rotation of the beam is achieved at smaller fibre angles, at a fibre angle β of 9.3° instead of 12.2° as illustrated. A smaller deflection of the beam is thereby obtained. In regard to the effect upon the deformation of the structural element, the influence exerted by the deformation couplings is of the same order of magnitude as that of the stiffness coefficients of the structure. This is of particular importance when designing resilient aerofoils in which there is an interaction between the deformation of the wing structure and the load.

Figure 14:
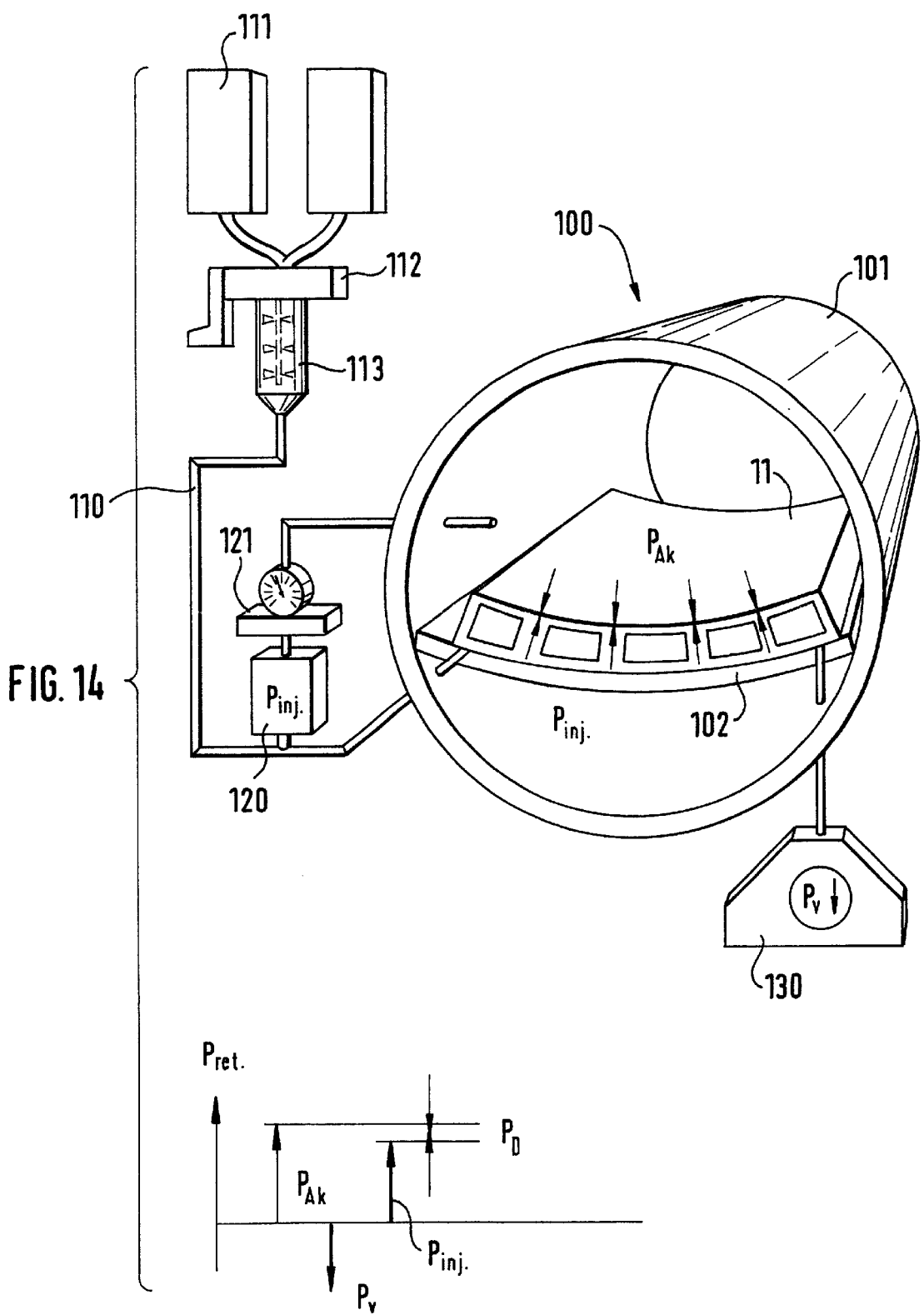
FIG. 14 is a view of an autoclave for manufacturing a structural element constructed in accordance with the invention.

FIG. 14 illustrates a view of an exemplary autoclave 100 for manufacturing a structural element constructed in accordance with the invention. The autoclave has a vacuum-tight cover 101. A molding cavity 102 is provided therein, and a dry semifinished layered product 11 is positioned and fixed thereon by means of a one-sided stitching technique.

A pipework system 110 leads to the autoclave. Resin 111 and a second component are fed into the pipework system at a specific mixing ratio. The resin mixture is supplied to an injection device 120 via a mixer 113 provided with a tap 112. The injection device subjects the mixture to a predetermined pressure $P_{inj}$ by means of a nozzle 121.

On the other hand, a partial vacuum $P_{Ak}$ is created in the autoclave by means of a vacuum pump 130 of the autoclave producing a pressure $P_V$.

There is a difference between the injection pressure and the autoclave pressure which is referenced as the pressure difference $P_D$. The setting of the pressure difference with the aid of the nozzle allows the volumetric content of the fibre to be adjusted and the speed of the flow front to be regulated. This process is also referred to as a DP-RTM process i.e. a Differential Pressure Resin Transfer Molding process in which the pressure in the autoclave provides the necessary counter pressure to the resin filling.

Figure 15:
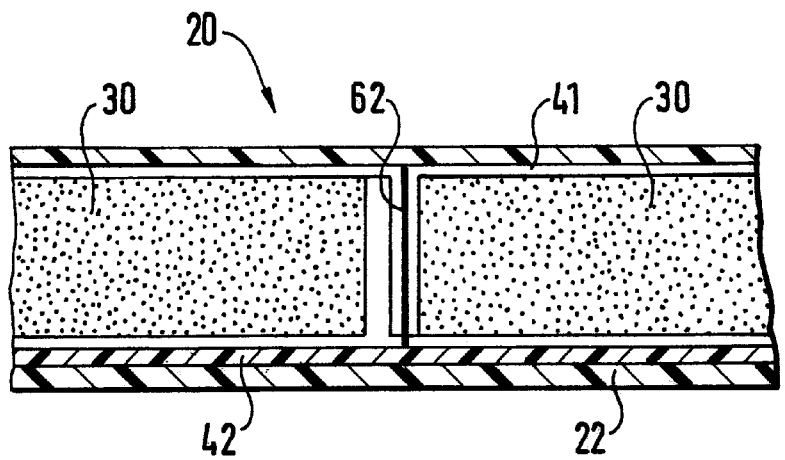
FIG. 15 is a detail of an alternative embodiment to FIG. 9.
Figure 16:
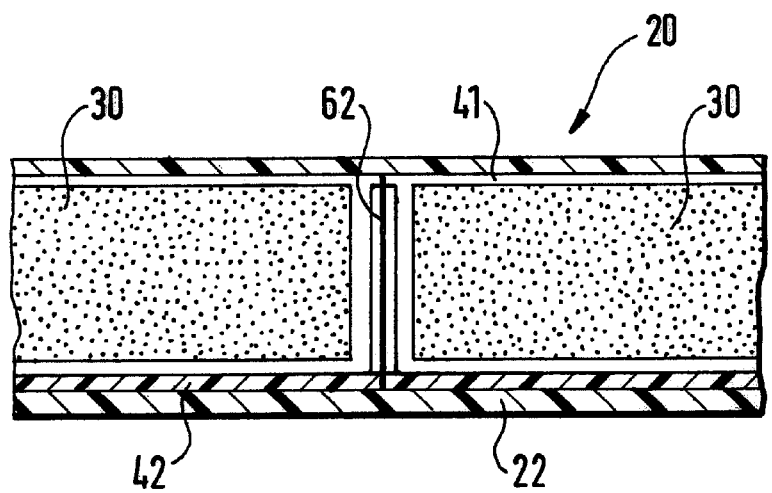
FIG. 16 is a detail of another alternative embodiment to FIG. 9.
Figure 17:
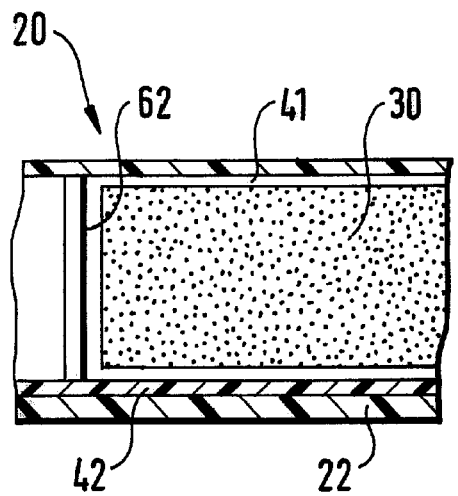
FIG. 17 is a detail of a third alternative embodiment to FIG. 9.

FIGS. 15, 16 and 17 show a preferred variant of FIG. 9. In contrast to the above description in respect of FIG. 9, provision is made here for the parting layer 62 to be arranged only and exclusively in the region of the shell skin 20 and not projecting into the stringers. This version has the advantage of reducing the section modulus. The three FIGS. 15 to 17 thereby show that this parting layer can be embedded in different ways between the segments 70 and can be surrounded by sheaths 41, 42.

Figure 18:
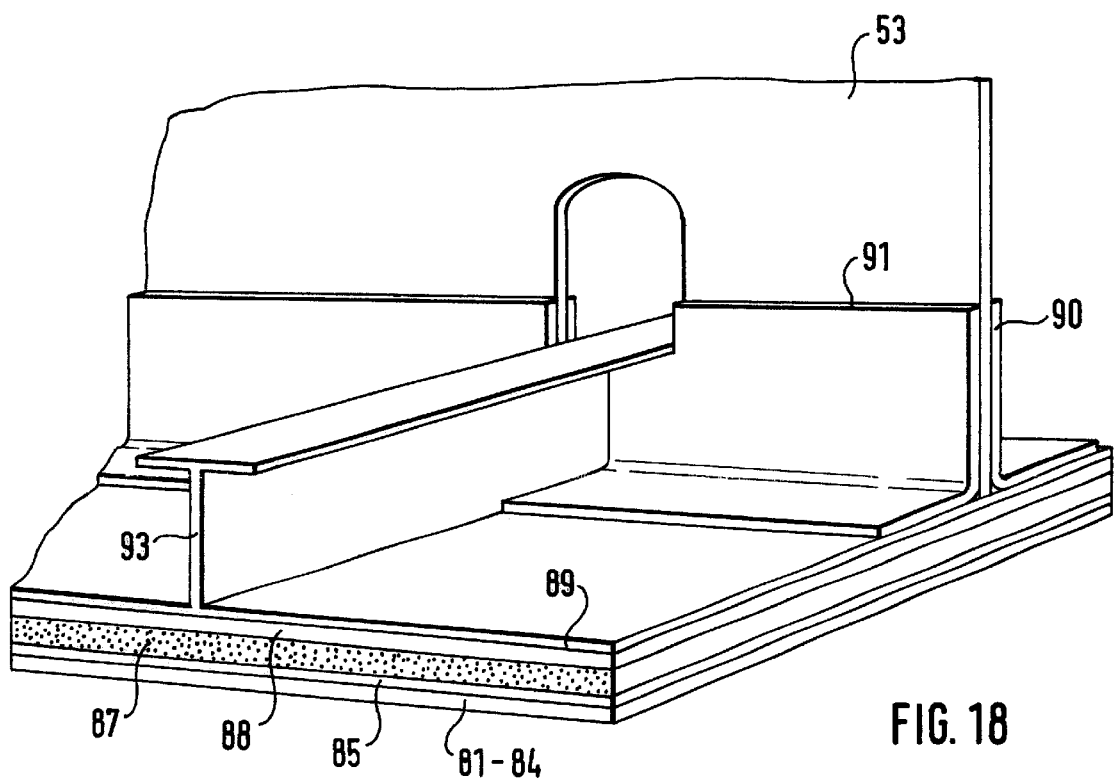
FIG. 18 is a perspective view of the embodiment of FIG. 9.

Finally, FIG. 18 likewise shows a perspective illustration of the embodiment of FIG. 9 or FIGS. 15 to 17 which provides a clear indication of the arrangement of the various stringers relative to one another and to the shell skin.

The structural element constructed in accordance with the invention can be manufactured using any manufacturing process. However, it is advantageous to use an injection process which allows the use of dry fibre layers and the use of fibre preforms.

As a result of the introduction of parting walls and/or joints in accordance with the invention, uniaxial stresses are produced in the layers formed by the unidirectional fibre strands, these stresses being in conformity with the directional properties of the fibers.

It will be understood that various modifications may be made to the embodiment disclosed herein. Therefore, the above description should not be construed as limiting, but merely as exemplifications of a preferred embodiment. Those skilled in the art will envision other modifications within the scope spirit of the invention.

What is claimed is:

1. A structural element of high unidirectional rigidity, in which unidirectional fibre strands are completely embedded in sheaths and said sheaths are connected to a laminate shell skin and wherein part of the shell skin is in the form of stringers whereby the shell skin has a skin plane and comprises a skin thickness, wherein the cross-section of the shell skin is arranged to provide the strength of the fibers and the stiffness of the fibers in a direction perpendicular to the skin plane for every direction of loading, and in that one or more parting layers are provided in an upstanding skin fold of a stringer.

2. The structural element in accordance with claim 1, wherein the orientation of the fibers in the laminates of the shell skin is substantially ±45° with angular variations of ±10°.

3. The structural element according to claim 1, wherein for sections in the shell skin subject to a load, longitudinal force flows are guided around these sections.

4. The structural element according to claim 1, wherein the shell skin thickness is selected to be so great that the shape of the cross-section is adapted to be independently and continuously varied.

5. The structural element according to claim 1, wherein there are provided a supporting layer for accommodating longitudinal elongations and a supporting layer for accommodating shear deformations of up to predeterminable magnitudes.

6. The structural element in accordance with claim 5, wherein the longitudinal supporting layer and the shear supporting layer of the shell skin are connected together and a boundary layer is provided between the longitudinal supporting layer and the shear supporting layer for accommodating the forces arising from their combined deformation.

7. The structural element in accordance with claim 1, wherein the cross-section and the orientation of the fibers of the encased fibre strands are adaptable to the specific application of use and in dependence on the load.

8. The structural element in accordance with claim 1, wherein a fibre stiffener is arranged in the region of the fibre strands in the sheath.

9. The structural element in accordance with claim 1, wherein a fibre stiffener is provided in the folds of the shell skin or the stringers.

10. The structural element in accordance with claim 1, wherein a fibre stiffener is provided in the region of the shear resistant laminate of the shell skin.

11. The structural element in accordance with claim 10, wherein the fibre stiffener in the region of the shear resistant laminate is provided in the form of a sewn reinforcement.

12. The structural element in accordance with claim 1, wherein the fibre stiffener is aligned in the direction of the cross-sectional parameters caused by an external load (P).

13. The structural element in accordance with claim 1, wherein there is provided a unidirectionally aligned fibre strand whose orientations and/or preferred directions of the material properties are in conformity with the state of stress.

14. The structural element in accordance with claim 1, wherein an anisotropic material is used to form the fibre strand.

15. The structural element in accordance with claim 14, wherein the fibre strands consist of a fibre material.

16. The structural element in accordance with claim 1, wherein the dimensions of the fiber strands, the shear resistant shell skin, or both the fiber strands and the shear resistant shell, are independent of each other and are adaptable to the requirements appropriate to the application.

17. A method of producing dimensioned amounts of fibre stiffness perpendicular to the skin plane of the shell skin in the case of large structural elements in accordance with claim 1, wherein a differential pressure resin transfer molding injection process is used to produce uniaxial stresses in layers formed by the unidirectional fiber strands and in which the stresses are in conformity with the directional properties of the fibers.

18. The method in accordance with claim 17, wherein a dry, semi-finished layered product is positioned and fixed in a molding cavity of the autoclave by stitching, and that the dry, semi-finished layered product is moistened with resin at a controlled flow speed.

19. The structural element of claim 1, wherein the partition is provided adjacent the upstanding skin fold.

20. The structural element of claim 1, wherein parting layer is provided within the shear resistant sheath of a fibre strand.

21. The structural element of claim 1, wherein the orientation of the fibers in the laminates of the shell skin is substantially 0° to 25° with variations of ±10°.

22. A structural element of high unidirectional rigidity, in which unidirectional fibre strands are completely embedded in sheaths and said sheaths are connected to a laminate shell skin and wherein part of the shell skin is in the form of stringers whereby the shell skin has a skin plane and comprises a skin thickness, wherein the cross-section of the shell skin is arranged to provide the strength of the fibers and the stiffness of the fibers in a direction perpendicular to the skin plane for every direction of loading, and in that one or more joints are provided in the upstanding skin fold of a stringer.

* * * * *